Jan. 24, 1967  J. L. ALLETRU  3,300,743
ULTRA-SENSITIVE RE-SETTING ELECTRO-MAGNETIC TRIP DEVICE
Filed Dec. 28, 1964  3 Sheets-Sheet 1

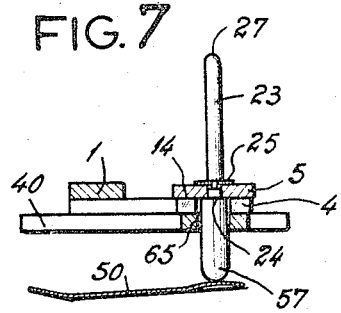
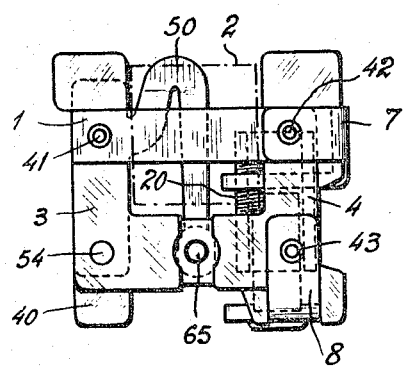
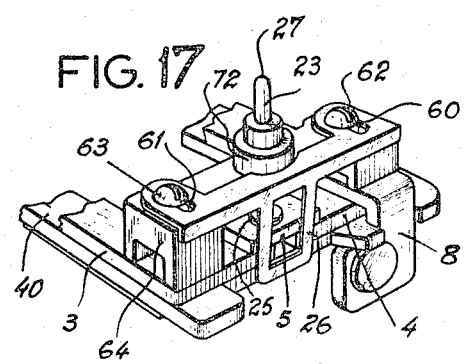
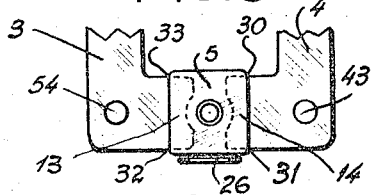
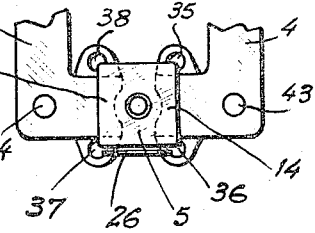
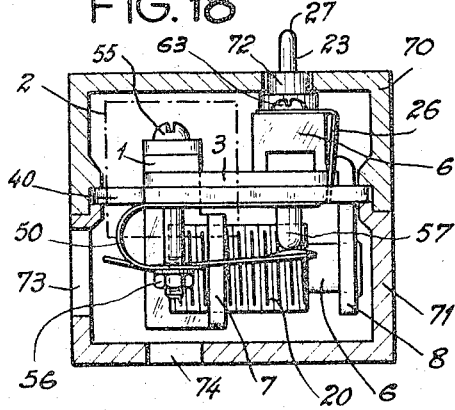
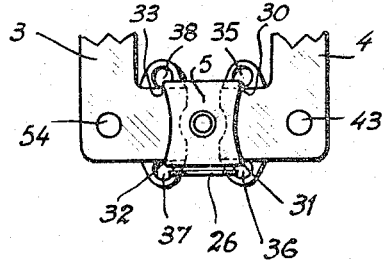

United States Patent Office 3,300,743
Patented Jan. 24, 1967

3,300,743
ULTRA-SENSITIVE RE-SETTING ELECTRO-
MAGNETIC TRIP DEVICE
Jean Louis Alletru, Maintenon, France, assignor to Société Anonyme: Etablissements Bresson-Faille-Marchand
Filed Dec. 28, 1964, Ser. No. 421,331
Claims priority, application France, Jan. 2, 1964, 959,164, Patent 1,390,282
2 Claims. (Cl. 335—176)

The present invention relates to an ultra-sensitive electro-magnetic re-setting tripping device, of the type responding to electric excitation by releasing its ferro-magnetic blade, which it is then necessary to re-set to the working position by an external mechanical action.

Devices of this kind are known, for example from French Patent No. 1,258,367, filed on March 2, 1960, and its first Certificate of Addition No. 80,080, filed on July 10, 1961, in the name of the present applicant. Very briefly, the invention relates to a tripping device adapted for the same purposes as that described in the said certificate of addition, but which differs therefrom in the characteristic features specified below.

More precisely, the present invention relates to a tripping device operated by a very small current which may be either direct or alternating current or even of any wave-form, the passage of this current in the tripping coil of the device annulling the holding of the moving member or blade of the tripping device by the permanent magnet of the said device.

An object of the invention is to provide a tripping device of this kind, in which the part of the magnetic flux of the permanent magnet which serves to hold the blade is adjustable in a progressive manner over a wide range.

A further object of the invention is to provide a release device of the kind referred to, in which the permanent magnet is placed outside the de-magnetizing action of the magnetic flux produced during release by the tripping coil.

A further object of the invention is to provide a tripping device of this kind, in which the permanent magnet and its air-gaps are shielded against external magnetic fields.

In consequence, the tripping device according to the invention is characterized by:

The positioning of the permanent magnet with respect to the elements of the ferro-magnetic circuit;

The principle of adjustment of the action of the permanent magnet;

The arrangement of the working air-gaps;

And a number of improvements concerning the mounting of the blade and the associated parts, together with the energy-storing spring.

In more detail, the tripping device according to the invention comprises a magnetic circuit constituted by a flat bar of ferro-magnetic material enclosed by a tripping coil, two flat pieces of ferro-magnetic material of L-shape, the top of the leg of each L being each applied against an extremity of the said bar, the ends of the L-shaped bars facing one another, a cylindrical permanent magnet provided with pole pieces, one of which is applied simultaneously against one extremity of the said bar and the top of the leg of the L-shaped piece applied against this extremity, the other being applied against the elbow of the same L-shaped piece, and a blade of ferro-magnetic material capable of being held against the said ends of the L-shaped pieces by a part of the magnetic flux due to the permanent magnet, and released by the passage of a current in the tripping coil which annuls the said portion of the flux of the permanent magnet; in addition, the permanent magnet is mounted in a fixed manner on one of its pole pieces, while its other pole piece is provided with a hollow cylinder of ferro-magnetic material capable of sliding axially in the said pole-piece and co-axially about the permanent magnet, thus forming a constant series air-gap and an adjustable parallel air-gap.

These characteristic features and improvements of the invention together with other advantages of the said invention will be brought out more clearly by means of the description which follows below with reference to the accompanying drawings given by way of example and without limitation. In these drawings:

FIGS. 6 and 7 are respectively a plan view and an axial section, these two figures showing the blade and the associated parts;

FIGS. 8 and 9 are analogous to FIG. 6, showing different arrangements of the blade and the associated parts;

FIG. 16 is a plan view of the tripping device;

FIG. 17 is a perspective view of a detail of the blade and its associated parts; and FIG. 18 is an axial section of the complete tripping device.

Figure 1:
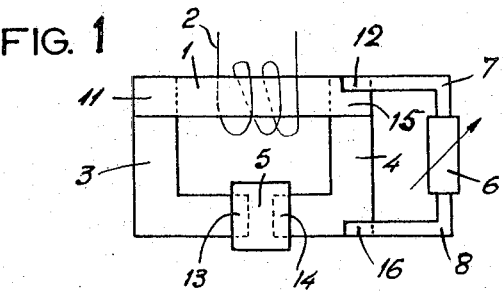
FIG. 1 shows the principle of one arrangement of the magnetic circuit of the tripping device.

FIG. 1 represents the principle of a magnetic circuit arrangement for the tripping device in accordance with the invention. This magnetic circuit is constituted by superimposed flat pieces, fixed together for example by bonding or by screws; this magnetic circuit comprises on the one hand a flat bar 1 receiving the tripping coil 2, and superimposed at the extremities of two L-shaped parts 3 and 4, on the other extremities of which is applied a blade 5 of ferro-magnetic material. The blade 5 is flat and rectangular in shape and is mounted so as to be capable of moving, during release, parallel to itself and perpendicular to the plane of the drawing. The magnetic circuit circuit further comprises a permanent magnet 6, the flux of which is adjustable in a manner which will be described below with reference to FIGS. 4 and 5. The magnet 6 is provided with two flat supports 7 and 8 of ferro-magnetic material which are superimposed on the bar 1 and on the L-shaped piece 4.

It will be observed that this construction of superposed flat elements forms air-gaps between them, namely the air-gap 11 between the bar 1 and the L-shaped piece 3, the air-gap 15 between the bar 1 and the L-shaped piece 4, the air-gap 13 between the L-shaped piece 3 and the blade 5, the air-gap 14 between the L-shaped piece 4 and the blade 5, the air-gap 12 between the bar 1 and the support 7, the air-gap 16 between the L-shaped piece 4 and the support 8. It is a simple matter to vary the size of each of these air-gaps 11, 12, 13, 14, 15 and 16 by a considerable value during manufacture, which gives a great flexibility of use to the whole unit, and constitutes an important advantage of the tripping device in accordance with the invention.

Figure 2:
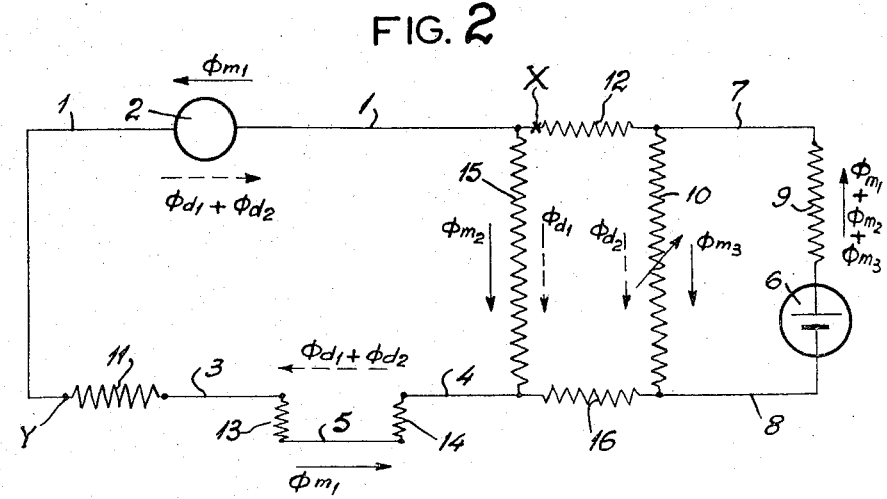
FIG. 2 shows the magnetic circuit corresponding to the magnetic circuit construction of FIG. 1.

FIG. 2 (which employs electrical symbols corresponding to the magnetic members) represents the magnetic diagram corresponding to the arrangement of the magnetic circuit shown in FIG. 1. There are again found the tripping coil 2, the blade 5 and the permanent magnet 6, the flux of which is adjustable by means of a constant air-gap 9 in series and an adjustable parallel air-gap 10, as will be described later with reference to FIGS. 4 and 5.

The flux $\phi m$ produced by the permanent magnet 6 passes through the series air-gap 9 and the support 7; here it divides, a fraction $\phi m3$ passes through the parallel air-gap 10 towards the support 8, and the remainder passes through the air-gap 12 and the bar 1, whereat it divides into two; the fraction $\phi m2$ passes through the air-gap 15 towards the L-shaped part 4, while the fraction $\phi m1$ follows the path constituted by the bar 1, the air-gap 11, the L-shaped piece 3, the air-gap 13, the blade 5, the air-gap 14 and the L-shaped piece 4. The two fractions $\phi m1$ and $\phi m2$ pass through the air-gap 16 and the whole of the flux $\phi m1 + \phi m2 + \phi m3$ returns through the support 8 to the permanent magnet 6.

It will be observed that the force of attraction resulting from the flux $\phi m1$ which holds the blade 5 in contact with the L-shaped pieces 3 and 4 is adjustable in a very wide and very flexible manner by reason of the number of air-gaps, together with their different actions which will be described later. The tripping flux $\phi d$ produced at the moment of release by the tripping coil 2, follows the bar 1, and sub-divides into: a fraction $\phi d1$ which passes through the air-gap 15 towards the L-shaped piece 4, a fraction $\phi d2$ which passes through the air-gap 12, the parallel air-gap 10, and the air-gap 16 towards the L-shaped piece 4; the flux $\phi d$ follows the path constituted by the L-shaped piece 4, the air-gap 14, the blade 5, the air-gap 13, the L-shaped piece 3, and the air-gap 11, and returns through the bar 1 to the tripping coil 2.

Strictly speaking, it should be stated that part of the fraction $\phi d2$ of the tripping flux $\phi d$ passes through the series air-gap 9 and the permanent magnet 6. However, because of this series air-gap and also because of the arrangement of the parallel air-gap 10 (which will be described later with reference to FIGS. 4 and 5) this shunt path of the tripping flux is in reality negligible. The result is that the permanent magnet is entirely protected against the de-magnetizing effect of the tripping flux, which constitutes an important advantage of the tripping device according to the invention.

In FIG. 2, the tripping flux $\phi d$ exerts on the blade 5 an action of opposite sense to the direction of the action of the fraction $\phi m1$ of the flux of the permanent magnet 6 so as to ensure separation of the blade 5. If the control current in the coil 2 is alternating, the detachment of the blade will be obtained during the suitable half-period of polarity, and if the control current is of any form, the detachment will be obtained during its passage in the appropriate sense.

Figure 3:
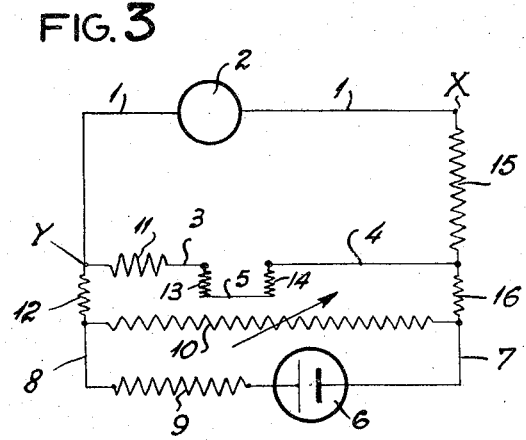
FIG. 3 is a magnetic diagram of an alternative form of the previous magnetic circuit.

It is clear that without departing from the scope of the invention, modifications can be made to the ferro-magnetic circuit which has just been described. For example, the magnetic connection at the point X of FIG. 2 can be interrupted and transferred to the point Y, which gives a ferro-magnetic circuit in accordance with the diagram of FIG. 3. This FIG. 3 naturally comprises the same parts with the same references as FIG. 2, and the description given for this latter figure remains valid for FIG. 3.

Figure 4:
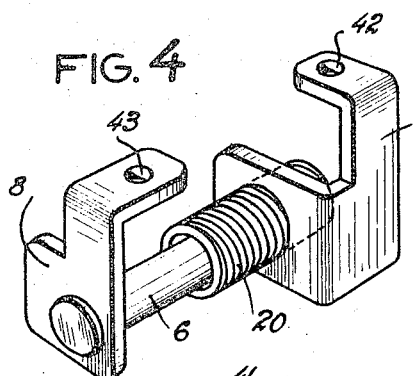
FIGS. 4 and 5 are respectively a perspective view and a cross-section taken through the axis of the permanent magnet, these two figures illustrating the regulation of the holding flux produced by the permanent magnet.
Figure 5:
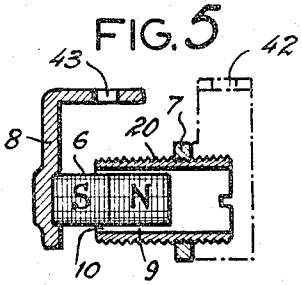

The principle of adjustment of the holding flux $\phi m$ produced by the permanent magnet 6 will be described with reference to FIGS. 4 and 5. FIG. 4 is a perspective view and FIG. 5 is a cross-section through the axis of the permanent magnet 6. This magnet 6 is of cylindrical shape with its poles at the extremities of the cylinder. It is fixed, for example by being banded to the support 8. A hollow cylindrical screw 20 of ferro-magnetic material, more or less encloses the magnet 6, depending on the extent to which it is screwed into the support 7. The hollow screw 20 is concentric and coaxial with the magnet 6, thereby ensuring the constancy of the series air-gap 9 between the screw 20 and the corresponding pole (for example the north pole, as shown in FIG. 5) of the magnet 6. The parallel air-gap 10 between the screw 20 and the other pole (for example the south pole of FIG. 5), has a reluctance which can be varied by screwing-in or out the screw 20.

It is not necessary to have absolute perfect concentricity of the screw 20 and the magnet 6, which facilitates the construction. It will be noted that the screw 20 shields the magnet 6 and the series air-gap 9 against the effect of external magnetic fields, which forms an important advantage of the tripping device according to the invention. Furthermore, it has already been stated that the series air-gap 9 protects the permanent magnet 6 against the de-magnetizing influence of the tripping flux produced by the tripping coil. In addition, this series air-gap 9 permits the stabilization of the flux $\phi m$ produced by the permanent magnet 6, in spite of the variations in reluctance of the magnetic utilization circuits, which constitutes a further important advantage of the tripping device according to the invention.

The arrangement of the working air-gaps 13 and 14 between the blade 5 and the L-shaped parts 3 and 4 will be described with reference to FIGS. 6 and 7. The blade 5 is flat and of generally rectangular shape, and is mounted with a certain play on a shaft 23 on which it is held between a shoulder 24 and a split-ring 25. This play is necessary in order to ensure a flat bearing surface for the blade 5 on the L-shaped pieces 3 and 4. In addition, the blade 5 is guided in its movement by a guide 26 which takes-up the above-mentioned play and maintains a constant relation of the surfaces corresponding to the working air-gaps 13 and 14.

In order to re-set the tripping device according to the invention, a force is applied from the exterior on the extremity 27 of the shaft 23. The blade 5 is attracted by the flux $\phi m1$ of the permanent magnet and contacts the L-shaped pieces 3 and 4; taking into account the above-mentioned play, the blade 5 before it is engaged flat on the L-shaped pieces 3 and 4, strikes these pieces at a variable angle and at corresponding points on its perimeter. Experience has shown with regard to these points that they are undesirable. If all the cases which can arise are studied, it can be deduced that it is advantageous for the maintenance of the lengths of the working air-gaps 13 and 14 (directly associated with the fidelity of the tripping device as a function of operations), to adopt a shape of air-gap, and a corresponding outline, such as shown in FIG. 6.

In fact, only two cases are thus possible: either the blade 5 strikes one of the edges of one of the L-shaped pieces 3 or 4 at one of the points 30, 31, 32 or 33, in which case an increase of the length of the air-gaps 13 and 14 does not take place, the material being pushed back to the exterior of the useful perimeter of the blade 5 and of the L-shaped pieces 3 and 4, or alternatively the blade moves back into contact with one of its edges 30–31 or 32–33 parallel to the L-shaped pieces 3 and 4, in which case the pressure capable of damaging the air-gap surfaces 13 and 14 is limited by the very fact that the shock is effected along the entire edge and not at a point or over a small zone, as would be the case with other shapes.

Other arrangements of the blade and of its associated parts will be described with reference to FIGS. 8 and 9 which are similar to FIG. 6. In FIG. 8, four fixed studs 35, 36, 37 and 38 are rigidly fixed to the L-shaped pieces 3 and 4 and are machined to the same level as these pieces. When re-setting the tripping device, instead of the blade 5 being able to strike one of the edges of one of the L-shaped pieces 3 and 4, as stated above, the blade strikes the face of one of the studs 35, 36, 37 and 38, that is to say outside the perimeter of the working air-gaps, with the same advantage in the maintenance of these air-gaps. The edges 30–31 and 32–33 of the blade 5 may be slightly concave, as shown in FIG. 9, in order still further to increase the safety in obtaining the desired effect.

A construction of the tripping device according to the invention will now be described with reference to FIGS.

10 to 18, in addition to FIGS. 4, 5, 6 and 7 already described.

Figure 10:
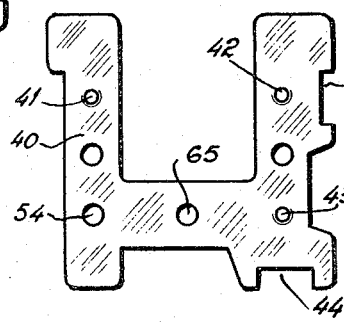
FIGS. 10-13 are plan views showing the successive stages of manufacture of the tripping device.
Figure 11:
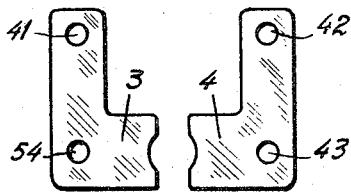
Figure 12:
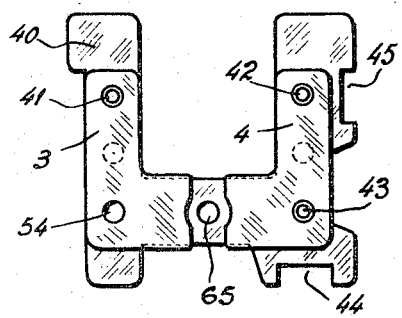

With reference to FIG. 10, a plate 40 is made of non-ferro-magnetic material; its general shape is that of a U, with parts cut-out as shown and which are described later. This plate 40 serves as a support for the whole of the tripping device. The two L-shaped pieces 3 and 4 are bonded to the plate 40 (FIG. 11) by means of a synthetic resin, the said pieces being constituted of a ferro-magnetic metal of high permeability, to produce the unit shown in FIG. 12. If so required (alternative shown in FIG. 8), the four studs 35, 36, 37 and 38 are driven by force into the plate 40. The outer surfaces of the L-shaped pieces 3 and 4 (and if necessary those of the studs) is machined in an appropriate manner.

Figure 13:
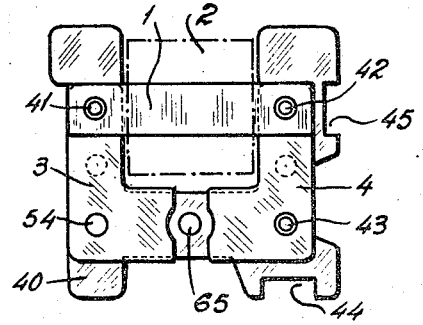

The ease of machining conferred by the above method of construction will be noted. The unit shown in FIG. 12 constitutes the base portion of the stator of the tripping device. The bar 1, cut-out from ferro-magnetic metal of high permeability is fixed on the stator at 41 and 42 (see FIG. 13). It carries the tripping coil 2 (which, for the sake of clearness of the drawings, is shown only by its contour in chain-dotted lines in FIG. 13 and the following figures). The supports 7 and 8 of the magnet 6 (FIGS. 4 and 5) are made from ferro-magnetic metal with very low remanence. The permanent magnet 6 is secured by bonding on the support 8, which is fixed at 43 on the stator, said support 8 being housed in a cut-out portion 44 of the plate 40 (see FIG. 10). The support 7 (FIGS. 4 and 5) receives the regulating screw 20, made from a ferro-magnetic metal with very low remanence; the support 7 is fixed at 42 on the stator and is housed in a cut-out portion 45 of the plate 40 (see FIG. 10).

Figure 14:
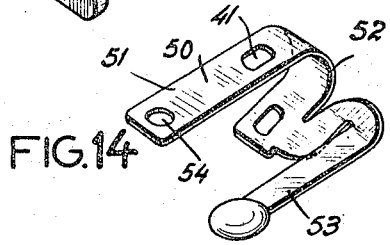
FIG. 14 is a view in perspective of the energy-storing spring.
Figure 15:
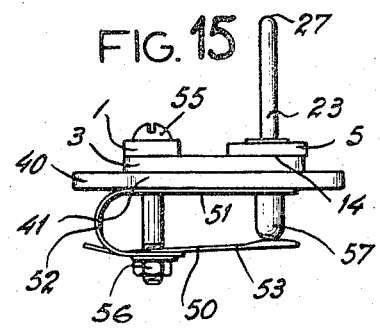
FIG. 15 is a view in elevation of the tripping device.

The energy-storing spring which acts in opposition to the attraction force on the blade is a flat spring 50 (see FIG. 14) formed by bending a cut strip to a U-section, said spring having a fixing arm 51, an adjustment bend 52 and a working limb 53. The spring 50 is mounted at 41 and 54 on the underside of the plate 40; the adjustment of its strength is effected by a screw 55 and nut 56 passing through the U-bend portion 52 (FIG. 15). Its working limb 53 has its extremity in contact with an extension 57 of the shaft 23 of the blade 5. The unit thus constituted is shown in FIG. 16. The moving system, namely the blade 5 and the associated parts has already been described with reference to FIGS. 6 and 7.

The blade 5, of rectangular shape and of very small dimensions is constituted of a ferro-magnetic metal of high permeability. It is machined on the face which comes into contact with the L-shaped pieces 3 and 4. Its guide 26 is a spring blade, cut-out and bent as shown in perspective in FIG. 17; the guide blade 26 is very flexible so as not to hinder to any substantial extent the lateral movement of the blade 5 as it is released. The position of the spring 26 is adjustable by slots 60 and 61 therein co-operating with the fixing screws 62 and 63 on the part 64.

The part 64 is a moulded piece, of thermo-plastic material for example, constituting at the same time the upper bearing and the end-of-travel abutment for the spindle 23 of the blade 5. This spindel 23 has its lower bearing formed by a hole 65 provided in the plate 40.

As shown in FIG. 18, the assembly of the tripping device is mounted in a casing composed of two half casings 70 and 71; the cylindrical bearing surface 72 of the part 64 ensures the positioning of the unit in the casing. The closable orifice 73 enables the flux of the magnet to be regulated from the exterior by the screw 20 which thus adjusts the force of adhesion of the blade 5. The closable orifice 74 permits the adjustment from the exterior of the strength of the spring 50, namely of the force acting on the blade 5 during tripping. These external adjustments give the tripping device according to the invention a great flexibility of adaptation.

What I claim is:

1. An ultra-sensitive re-setting trip device comprising a magnetic circuit and a blade of ferro-magnetic material, said magnetic circuit comprising a flat bar of magnetic material, a tripping coil wound on said flat bar, first and second flat pieces of ferro-magnetic material having arms arranged in L-shape, an end of one arm of the first L-shape piece being in secured engagement with said flat bar at one extremity thereof, and an end of one arm of the second L-shape piece being in engagement with said flat bar at the other extremity thereof, the free ends of the other of the arms of the two L-shape pieces facing each other with an air gap therebetween, a cylindrical magnet, a first pole piece supporting said magnet and mounted at said first extremity of said flat bar and secured to said one arm of the first L-shape piece, a second pole piece mounted on the first L-shape piece at the intersection of the arms thereof, and a hollow cylinder of ferro-magnetic material slidably mounted in said second pole piece coaxially around said permanent magnet, mounting means for said blade comprising a U-shaped plate of non-ferro-magnetic material, said L-shaped pieces being secured on said plate with said one arm of the L-shape pieces applied against the arms of the U-shaped plate and the other arms of the L-shape pieces against the cross member of the U-shaped plate which joins said arms thereof, said plate having a hole aligned at the center of said air gap, a shaft slidable in said blade in a hole therein, said shaft including an extension defining a shoulder abutting said blade, said extension passing slidably through said hole in the plate, a split ring on said shaft holding said blade with play against said shoulder so that said blade is movable along said shaft between the split ring and the shoulder, a flat spring adjacent said blade for guiding said blade in its movement, and an energy-storing spring comprising a fixing arm secured to said U-shaped plate, on open adjustment bend with a regulating screw, and a working limb in contact with said extension of said shaft.

2. A trip device as claimed in claim 1 comprising a casing constituting a closure for said trip device and including two half-casings holding between them said U-shaped plate of non-ferro-magnetic material, said casing having an orifice for the passage of said shaft, a first closable orifice furnishing access for the sliding adjustment of said hollow cylinder, and a second closable orifice for enabling the adjustment of said regulating screw of said energy-storing spring.

References Cited by the Examiner

UNITED STATES PATENTS 2,899,654  8/1959  Geiser _____ 336—135 X
3,236,966  2/1966  Alletru _____ 200—95

BERNARD A. GILHEANY, *Primary Examiner.*

H. A. LEWITTER, *Assistant Examiner.*